United States Patent
Prideaux-Ghee et al.

(10) Patent No.: US 10,572,716 B2
(45) Date of Patent: Feb. 25, 2020

(54) PROCESSING UNCERTAIN CONTENT IN A COMPUTER GRAPHICS SYSTEM

(71) Applicant: PTC Inc., Needham, MA (US)

(72) Inventors: Stephen Prideaux-Ghee, Bristol (GB); Andre Gosselin, Montreal (CA); Per Nielsen, San Diego, CA (US); Vincent Del Castillo, Montreal (CA); Qi Pan, Vienna (AT); Michael Gervautz, Vienna (AT)

(73) Assignee: PTC Inc., Needham, MA (US)

( * ) Notice: Subject to any disclaimer, the term of this patent is extended or adjusted under 35 U.S.C. 154(b) by 86 days.

(21) Appl. No.: 15/789,316

(22) Filed: Oct. 20, 2017

(65) Prior Publication Data
US 2019/0122027 A1    Apr. 25, 2019

(51) Int. Cl.
  *G06K 9/00*  (2006.01)
  *G06T 7/00*  (2017.01)
  *G06T 7/246*  (2017.01)

(52) U.S. Cl.
  CPC .......... *G06K 9/00201* (2013.01); *G06T 7/248* (2017.01); *G06T 7/251* (2017.01); *G06T 2200/04* (2013.01); *G06T 2200/24* (2013.01); *G06T 2207/10016* (2013.01)

(58) Field of Classification Search
  CPC ..... G06K 9/00201; G06T 7/251; G06T 7/248; G06T 2200/04; G06T 2200/24; G06T 2207/10016
  See application file for complete search history.

(56) References Cited

U.S. PATENT DOCUMENTS

| | | | |
|---|---|---|---|
| 9,361,716 | B1 | 6/2016 | Erikson |
| 9,754,413 | B1 | 9/2017 | Gray |
| 2004/0100556 | A1 | 5/2004 | Stromme |
| 2011/0058187 | A1 | 3/2011 | Smith |
| 2013/0201185 | A1 | 8/2013 | Kochi |

(Continued)

FOREIGN PATENT DOCUMENTS

| | | |
|---|---|---|
| WO | WO-2016/064435 A1 | 4/2016 |
| WO | WO-2016/179248 A1 | 11/2016 |
| WO | WO-2018/213702 A1 | 11/2018 |

OTHER PUBLICATIONS

International Search Report for PCT/US2018/033385 (Augmented Reality System filed May 18, 2018), issued by ISA/EP, 4 pages. (dated Jul. 25, 2018).

(Continued)

*Primary Examiner* — Ping Y Hsieh
(74) *Attorney, Agent, or Firm* — Burns & Levinson LLP

(57) ABSTRACT

An example method includes: obtaining, from computer memory, information from a three-dimensional (3D) graphical model that represents an object; identifying, based on the information, a first part of the object having an attribute; performing a recognition process on the object based on features of the object, where the recognition process attaches more importance to a second part of the object than to the first part, with the second part either not having the attribute or having less of the attribute than the first part; and providing data for rendering content on a graphical user interface based, at least in part, on recognition of the object performed by the recognition process.

21 Claims, 8 Drawing Sheets

(56) References Cited

U.S. PATENT DOCUMENTS

| | | | |
|---|---|---|---|
| 2014/0186002 A1 | 7/2014 | Hanaya et al. | |
| 2014/0310595 A1 | 10/2014 | Acharya et al. | |
| 2015/0029222 A1* | 1/2015 | Hofmann | G06K 9/00993 |
| | | | 345/633 |
| 2015/0052479 A1 | 2/2015 | Ooi | |
| 2015/0332512 A1* | 11/2015 | Siddiqui | G06T 7/73 |
| | | | 345/633 |
| 2016/0005211 A1 | 1/2016 | Sarkis et al. | |
| 2016/0328883 A1 | 11/2016 | Parfenov et al. | |
| 2017/0068314 A1 | 3/2017 | Fu et al. | |
| 2018/0025544 A1 | 1/2018 | Schoeller et al. | |
| 2018/0341808 A1* | 11/2018 | Holzer | G06F 16/587 |
| 2019/0120619 A1* | 4/2019 | Miura | G01B 21/20 |

OTHER PUBLICATIONS

Office Action for U.S. Appl. No. 15/789,329, 34 pages (dated Sep. 7, 2018).

Office Action for U.S. Appl. No. 15/789,341, 35 pages (dated Sep. 7, 2018).

Office Action for U.S. Appl. No. 15/146,398, 24 pages (dated Oct. 4, 2018).

Written Opinion for PCT/US2018/033385 (Augmented Reality System filed May 18, 2018), issued by ISA/EP, 7 pages (dated Jul. 25, 2018).

File History of U.S. Appl. No. 15/146,398, 195 pages.

International Preliminary Report on Patentability for PCT/US2016/030720 (Augmented Reality System, filed May 4, 2016), issued by IB/WIPO,15 pages (dated Nov. 16, 2017).

International Search Report for PCT/US2016/030720, 6 pages (dated Sep. 4, 2016).

Invitation to Pay Additional Fees and, Where Applicable, Protest Fee for PCT/US2016/030720, 7 pages (dated Jul. 11, 2016).

Nicolai, T. and Michelis, D., The Web of Augmented Physical Objects, Proceedings of the ICBM, 340-346 (2005).

Office Action for U.S. Appl. No. 15/146,398, 23 pages (dated Aug. 25, 2017).

Written Opinion for PCT/US2016/030720, 12 pages (dated Sep. 4, 2016).

Final Office Action for U.S. Appl. No. 15/146,398, 24 pages (dated Mar. 21, 2018).

U.S. Appl. No. 15/789,329, Generating Time-Delayed Augmented Reality Content, filed Oct. 20, 2017.

U.S. Appl. No. 15/789,341, Displaying Content in an Augmented Reality System, filed Oct. 20, 2017.

U.S. Appl. No. 62/509,359, Displaying Content in an Augmented Reality System, filed May 22, 2017.

U.S. Appl. No. 62/508,948, Displaying Content in an Augmented Reality System, filed May 19, 2017.

Office Action dated Sep. 19, 2019 in U.S. Appl. No. 15/789,341.

Office Action dated May 1, 2019 in U.S. Appl. No. 15/789,329.

* cited by examiner

PROCESSING UNCERTAIN CONTENT IN A COMPUTER GRAPHICS SYSTEM

TECHNICAL FIELD

This specification relates generally to processing uncertain content in a computer graphics system.

BACKGROUND

Content recognition processes identify features in an image and match those features to known features of a real-world object. Content recognition processes are usable in a computer graphics system, such as an augmented reality (AR) system, to identify objects in images. In AR systems that employ content recognition processes, computer graphics may overlay a recognized object, or the computer graphics may be displayed alongside the object in the original image.

SUMMARY

An example method includes: obtaining, from computer memory, information from a three-dimensional (3D) graphical model that represents an object; identifying, based on the information, a first part of the object having an attribute; performing a recognition process on the object based on features of the object, where the recognition process attaches more importance to a second part of the object than to the first part, with the second part either not having the attribute or having less of the attribute than the first part; and providing data for rendering content on a graphical user interface based, at least in part, on recognition of the object performed by the recognition process. The example method may include one or more of the following features, either alone or in combination.

In the example method, attaching more importance to the second part of the object may include ignoring information about the first part of the object during the recognition process. In the example method, attaching more importance to the second part of the object ma include deemphasizing information about the first part of the object during the recognition process.

The example method may include tracking movement of the object from a first location to a second location. Tracking the movement may include: identifying, in the first image, a feature in the second part of the object, with the feature being identified based on a region in the second image that contains pixels having greater than a predefined difference; and identifying, in the second image, the feature in the second part of the object, with the feature being identified based on the region in the second image that contains the pixels having greater than the predefined difference. The second location may be based on a location of the feature in the second image.

The feature may be a first feature, and the tracking may include: identifying, in the first image, a second feature in the first part of the object, with the second feature being identified based on a second region in the second image that contains pixels having greater than a predefined difference; and identifying, in the second image, the second feature in the first part of the object, with the second feature being identified based on the second region in the second image that contains the pixels having greater than the predefined difference. The second location may be based on both the location of the first feature in the second image and the location of the second feature in the second image. Deemphasizing may include weighting the location of the second feature in the second image less heavily than the location of the first feature in the second image.

The attribute of the object may include an amount of reflectivity in the first part of the object, an amount of transparency in the first part of the object, and/or an amount of flexibility in the first part of the object. The attribute may include an amount of the first part of the objected that is coverable based on motion of one or more other parts of the object. The image may be captured within a field specified for recognition of the object.

An example method performed by one or more processing devices includes: obtaining, from computer memory, information from a three-dimensional (3D) graphical model that represents an object; identifying, based on the information, rigid components of the object that are connected by a flexible component of the object; performing a recognition process on the object based on features of the rigid components, with the recognition process attaching more importance to the rigid components than to the flexible components; and providing data for rendering content on a graphical user interface based, at least in part, on recognition of the object performed by the recognition process. The example method may include one or more of the following features, either alone or in combination.

The example method may include tracking movement of the object from a first location in the first image to a second location in a second image. Tracking the movement of the object from the first location in a first image to the second location in a second image may include ignoring the flexible component and not taking into account an impact of the flexible component when tracking the movement. Tracking movement of the object from the first location in the first image to the second location in the second image may include deemphasizing an impact of the flexible component when tracking the movement, but not ignoring the impact. Tracking movement of the object from the first location in the first image to the second location in the second image may include: tracking movement of the rigid components individually; and predicting a location of the flexible component based on locations of the rigid components following movement.

Any two or more of the features described in this specification, including in this summary section, may be combined to form implementations not specifically described in this specification.

All or part of the processes, methods, systems, and techniques described herein may be implemented as a computer program product that includes instructions that are stored on one or more non-transitory machine-readable storage media, and that are executable on one or more processing devices. Examples of non-transitory machine-readable storage media include, e.g., read-only memory, an optical disk drive, memory disk drive, random access memory, and the like. All or part of the processes, methods, systems, and techniques described herein may be implemented as an apparatus, method, or system that includes one or more processing devices and memory storing instructions that are executable by the one or more processing devices to perform the stated operations.

The details of one or more implementations are set forth in the accompanying drawings and the description below. Other features and advantages will be apparent from the description and drawings, and from the claims.

DESCRIPTION OF THE DRAWINGS

Like reference numerals in different figures indicate like elements.

DETAILED DESCRIPTION

Figure 1:
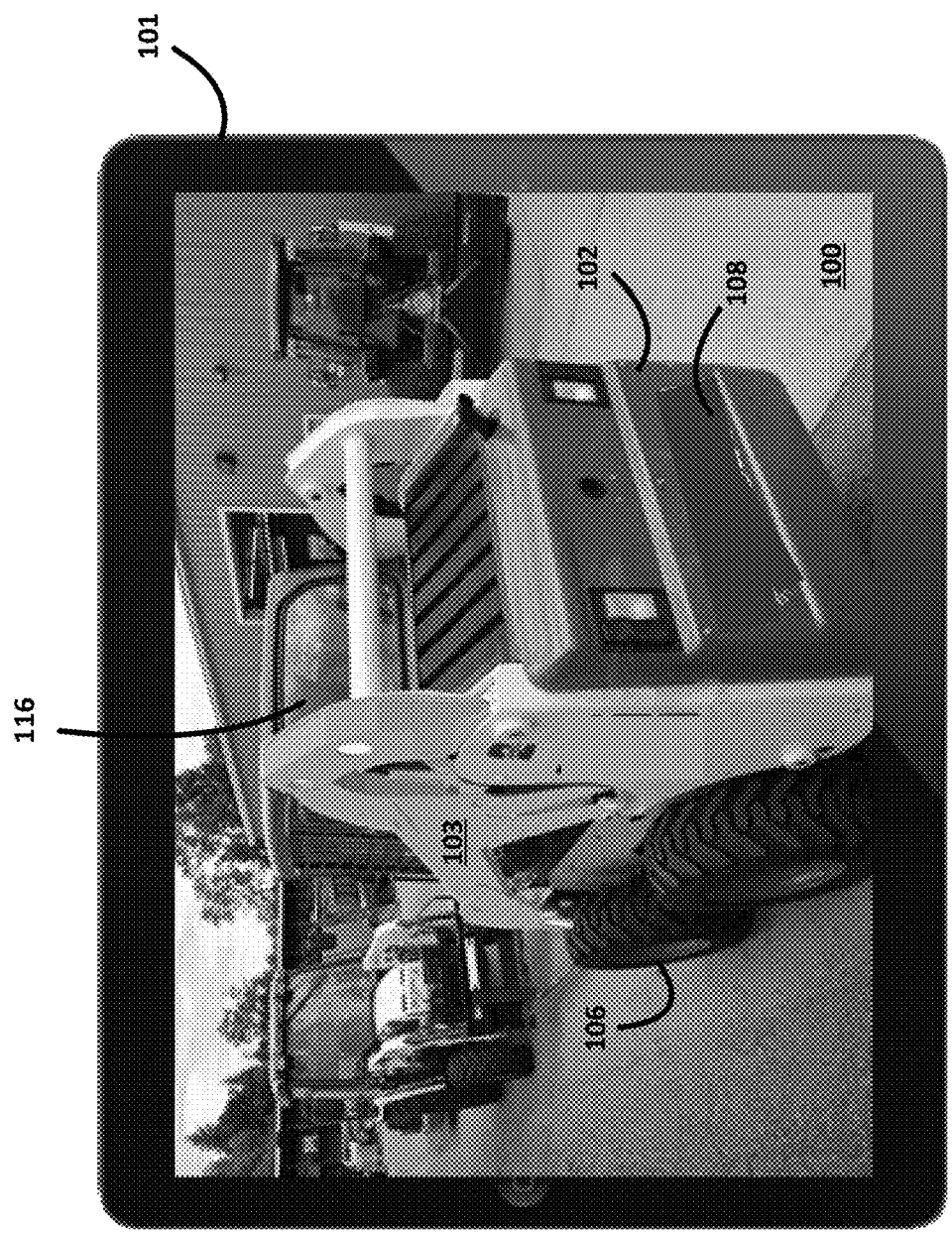
FIG. 1 is a diagram of a display screen showing an object and AR content.

Described herein are example processes, which may be performed by a computer graphics system, for recognizing and processing uncertain content. An augmented reality (AR) system is an example of a computer graphics system in which the processes may be used. However, the processes may be used in any appropriate technological context or computer graphics system, and are not limited to use with an AR system or to use with example AR system described herein.

In this regard, when recognizing and tracking content in images using computer vision processes, a factor that affects these operations is lighting and, in particular, the effects produced when light is cast upon reflective or translucent (e.g., polished or glass) surfaces. The specular highlights that result can create artificial visual artifacts that can confuse content recognition processes into thinking that the processes are seeing some natural feature in an image when, in fact, with a simple and sometimes small change in viewing angle, that feature moves/changes/disappears because the specular highlights change. Reflections and refractions in transparent materials can cause similar problems, creating artificial features that can result in false positives during recognition and tracking. Likewise, flexible components, such as cables and hoses, introduce areas of uncertainty both due to the tolerances of fitting such items (e.g., how they lie at rest relative to an object) and due to how those components move in position as rigid components of the object also move. The processes described herein use computer-aided design (CAD) information to identify moving parts of objects that may introduce uncertainty in content recognition results. By providing computer vision (CV) processes information about spatial regions where such uncertainty exists in an image, the CV processes can adapt and choose not to use information from parts of the object that produce such uncertainty, or deem phasize information from those parts of the object.

Accordingly, in some implementations, "uncertain" content includes, but is not limited to, content of an image that does not necessarily represent an object containing that content. For example, an image may include an object having parts that are specular, or reflective. When recognizing an object in the image—e.g., as part of an AR process—the parts of the image that are reflective may be deemphasized for reasons explained above. Take the case of an object, such as a loader (e.g., FIG. 1), that contains a windshield 116 that reflects objects in certain light. When attempting to recognize and to track the loader, the windshield may display reflected content, such as trees or clouds, due to its reflectivity. As a result of this reflected content, the recognition processes may have difficulty deciding that the object is a loader. In other examples, specular highlights, such as the sun on a wet road, can cause glare and other such effects that can not only mask the real features of an object, but can also generate some of high-contrast features that content recognition processes rely upon for accurate recognition. If these features disappear when the angle of light changes (which is what happens with specular highlights), then recognition processes may be confused about the content of the image.

Other attributes that can impact recognition processes include, but are not limited to, transparency, flexibility, refractivity, translucence, and movability. Consider the preceding loader example. In some light, windows may not reflect, but rather may be transparent. An image, therefore, may show what is on the other side of a window inside the operator cab such the seat and controls, which may impact the ability to recognize the loader in the image. In another example, flexible components, such as wires, hoses, or the like, may be difficult to track during motion, since their shapes and orientations may change between consecutive image frames. In another example, hinged parts that are connected for movement, such as arm 103 of the loader of FIG. 1, can cause uncertainty because they can block out areas of an image by virtue of their movement. Accordingly, parts of an object that have one or more of the foregoing attributes may also hinder content recognition processes.

The example processes described herein identify parts of an image that constitute uncertain content and, during recognition and tracking processes, place more importance on parts of the object that do not include uncertain content or that include less uncertain content than other parts of the object. In some implementations, placing more importance may include deemphasizing information from parts of the object that have more than a defined amount of an attribute, such as reflectivity, transparency, or flexibility, and/or emphasizing parts of the object that have less than a defined amount of the attribute. In some examples, deem phasizing a part includes ignoring information about the part. For example, information in the image from the deemphasized part may not be taken into account during recognition and tracking. In some examples, deemphasizing a part includes applying less weight to information representing the part than to information representing other parts of the object, e.g., other parts that do not have, or have less of, an attribute such as transparency, reflectivity, or flexibility. For example, information in the image from the deemphasized part may have applied a smaller weighting factor than information from the other parts of the image. In some examples, emphasizing a part includes applying greater weight to information representing parts of the object that do not have, or have less of, an attribute, such as transparency, reflectivity, or flexibility, than to information representing other parts of the object having more of the attribute. For example, information in the image from the emphasized parts may have applied a larger weighting factor than information from the other parts.

By way of example, a content recognition process (which may, or may not, be part of an object tracking process) may receive an image, and may attempt to recognize an object, such as a loader, in the image. This may include identifying enough parts of the object to associate, with the object, a graphical model identifying features of, and information about, the object. The content recognition process may identify, using information from this model, parts of the object that have uncertain content. In this example, information from those parts is deemphasized relative to other parts of the object that do not have uncertain content or that have uncertain content that is less pronounced (e.g., less of the uncertain content). In the loader example above, a window 116 may be highly reflective and also refractive (at certain angles), whereas shiny paint on front-end 108 may be reflective, but less so than the window. Accordingly, the recognition processes may give greater weight, during recognition, to information (e.g., pixels) representing the loader's front-end than to information representing the window. As a result, the window is deem phasized in the recognition process relative to the front-end (or conversely, the front-end is emphasized over the window). However, in this example, information from both the window and the front-end are considered. In some examples, recognition and tracking processes may give no weight to information representing the window, and base recognition solely on other parts of the object that exhibit less than a threshold amount of reflectivity.

For the purposes of the processes described herein, content, and objects that are part of that content, may include any appropriate structures, matter, features, etc. in an image. In an example, to recognize a scene, water, which may be highly reflective in certain light, may be deem phasized relative to flora in the scene.

Recognition processes include, but are not limited, to initial recognition of an object and tracking motion of that object in a series of frames, such as image frames of video containing that object. Example tracking processes perform recognition on an image-by-image (e.g., frame-by-frame) basis, as described herein.

As noted, the example processes are usable in an AR system. An AR system includes a type of computer graphics system that generates AR content. In some examples, AR content is generated by superimposing computer-generated content onto actual graphics, such as an image or video of a real-life object. Any appropriate computer-generated content may be used including, but not limited to, computer graphics, computer animation, and computer-generated text.

Referring to FIG. 1, example AR content 100 is shown on the display of tablet computing device 101. In this example, AR content 100 includes an image of a loader 102 and computer graphics 103 that are rendered at an appropriate location over the image of the loader. The image was captured by a camera or other appropriate image capture device. The computer graphics were generated by a computing device, such as a remote server or the tablet computing device, based on information about the object displayed (the loader). As described herein, the computer graphics may relate to the object in some way. For example, in FIG. 1, computer graphics 103 highlight a part of the loader, namely its arm.

The example AR system described herein is configured to recognize an object, such as the loader, in an image captured by an image capture device, and to map a three-dimensional (3D) graphical model to the image of the object. In an example, the 3D graphical model contains information about the object, such as the object's structure, current or past status, and operational capabilities. The mapping of the 3D graphical model to the image associates this information from the 3D graphical model with the image. In an example, a computer graphics rendering of a selected object part may be displayed, as is the case with the arm of FIG. 1. In another example, text associated with the selected part may be displayed.

In the example AR system, the 3D graphical model is controlled to track relative movement of an object in response to relative movement of the image capture device and the object. That is, the image capture device may move relative to the object, or vice versa. During that movement, the 3D graphical model is also controlled to track the relative movement of the object even as the perspective of the object in the image changes vis-à-vis the image capture device.

In the AR system, each instance of an object, such as loader 102, can have a digital twin (DT), which is described below. An instance of an object (or object instance) includes a unique specimen of an object that is differentiated from other specimens of the object. For example, a loader may have a vehicle identification (ID) number that distinguishes it from all other loaders, including those that are the same make and model. Different types of information may be used to identify the instance of an object, as described herein. A DT is specific to an object instance and, as such, includes information identifying the object instance. In some implementations, there may be a single DT for each corresponding object instance. As used herein, an object is not limited to an individual article, but rather may include, e.g., any appropriate apparatus, system, software, structure, entity, or combination of one or more of these, that can be modeled using one or more DTs.

In this regard, a DT is an example of a type of 3D graphical model that is usable with the AR system; however, other appropriate models may also be usable. An example DT includes a computer-generated representation of an object comprised of information that models the object (referred to as the physical twin, or PT) or portions thereof. The DT includes data for a 3D graphical model of the object and associates information about the object to information representing the object in the 3D graphical model. For example, the DT may include, but is not limited to, data representing the structure of the object or its parts, the operational capabilities of the object or its parts, and the state(s) of the object or its parts. In some implementations, a DT may be comprised of multiple DTs. For example, there may be a separate DT for each part of an object. For example, there may be a separate DT for each rigid component of an object. In some examples, a part of an object may include any appropriate component, element, portion, section, or other constituent of an object, or combination thereof.

A DT may be generated based on design data, manufacturing data, and/or any other appropriate information (e.g., product specifications) about the object. This information may be generic to all such objects. In the loader example of FIG. 1, the DT may be generated using data that describes the structure and operational capabilities of the type (e.g., make and model) of the loader shown. This data may be obtained from any appropriate public or private database(s), assuming permissions have been granted. For example, the DT may be generated using information obtained from, and/or are managed by, systems such as, but not limited to, PLM (product lifecycle management) systems, CAD (computer-aided design) systems, SLM (service level management) systems, ALM (application lifecycle management) systems, CPM (connected product management) systems, ERP (enterprise resource planning) systems, CRM (customer relationship management) systems, and/or EAM (enterprise asset management) systems. The information can cover a range of characteristics stored, e.g., in a bill of material (BOM) associated with the object (e.g., an EBOM—engineering BOM, an MBOM—manufacturing BOM, or an SBOM—service BOM), the object's service data and manuals, the object's behavior under various conditions, the object's relationship to other object(s) and artifacts connected to the object, and software that manages, monitors, and/or calculates the object's conditions and operations in different operating environments.

The DT may also be generated based on sensor data that is obtained for the particular instance of the object. For example, the sensor data may be obtained from readings taken from sensors placed on, or near, the actual instance of the object (e.g., loader 102). In this example, since that sensor data is unique to loader 102, the DT for loader 102 will be unique relative to DTs for other loaders, including those that are identical in structure and function to loader 102. The DT may also include other information that is unique to the object, such as the object's repair history, its operational history, damage to the object, and so forth.

The DT for an object instance may have numerous uses including, but not limited to, performing content recognition and tracking and generating AR content, as described herein. For example, the example AR system described herein may superimpose computer-generated content that is based on, or that represents, the DT or portions thereof onto an image of an object instance. Example processes performed by the AR system identify an instance of the object, generate AR content for the object using the DT for that object, and use that AR content in various ways to enable access to information about the object.

Figure 2:
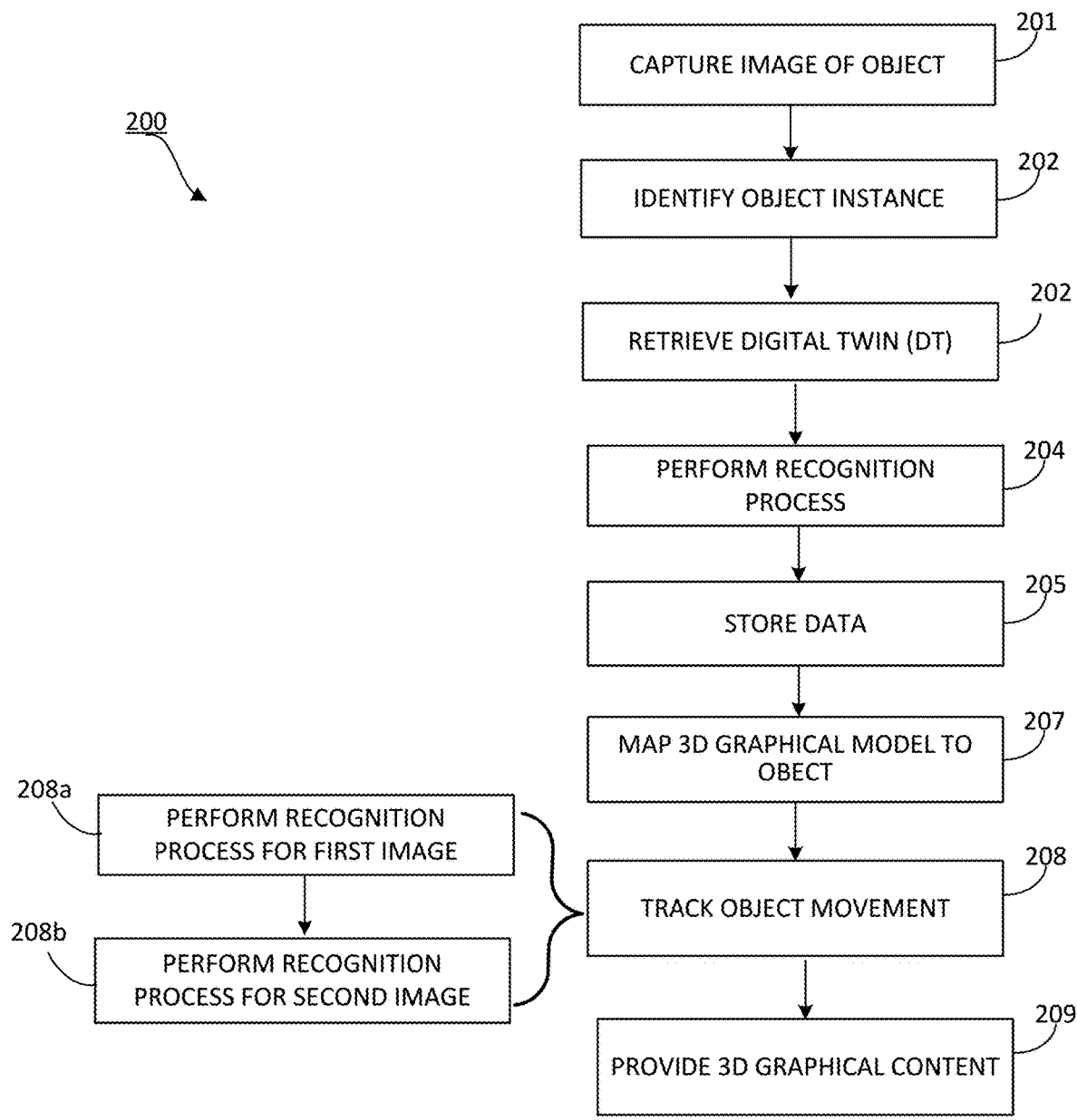
FIG. 2 is a flowchart of an example process for performing recognition and tracking processes on content in images.

An example process 200 that uses the DT to recognize and track objects in images or video is shown in FIG. 2. Example process 200 may be performed by the AR system described herein using any appropriate hardware.

According to process 200, an image of an object is captured (201) by an image capture device—a camera in this example. The object may be any appropriate apparatus, system, structure, entity, or combination of one or more of these that can be captured in an image. An example of an object is loader 102 of FIG. 1. The camera that captures the image may be a still camera or a video camera. The camera may be part of a mobile computing device, such as a tablet computer or a smartphone, or it may be a stand-alone camera.

Process 200 identifies (202) the object instance in the captured image, and retrieves (203) a DT for the object instance—in the example of FIG. 1, loader 102. A DT is used in this examples presented herein; however, any appropriate computer-aided design (CAD) or other computer-readable construct may be used in addition to, or instead of, the DT. Any appropriate identifying information may be used to identify the object instance. The identifying information may be obtained from the object itself, from the image of the object, from a database, or from any other appropriate source. For example, the identifying information may be, or include, any combination of unique or semi-unique identifiers, such as a Bluetooth address, a media access control (MAC) address, an Internet Protocol (IP) address, a serial number, a quick response (QR) code or other type of bar code, a subnet address, a subscriber identification module (SIM), or the like. Tags, such as RFIDs, may be used for identification. For objects that do not move, the identifying information may be, or include, global positioning system (GPS) or other coordinates that define the location of the object. For objects that do not include intelligence or other specific identifiers (like bar codes or readable serial numbers), unique features of the object in the image may be used to identify the object instance. For example, a database may store information identifying markings, wear, damage, or other distinctive features of an object instance, together with a unique identifier for the object. The AR system may compare information from the captured image to the stored information or a stored image. Comparison may be performed on a mobile device or on a remote computer. The result of the comparison may identify the object. After the object is identified, the DT for that object may be located (e.g., in memory, a location on a network, or elsewhere) using the obtained object identifier.

Figure 3:
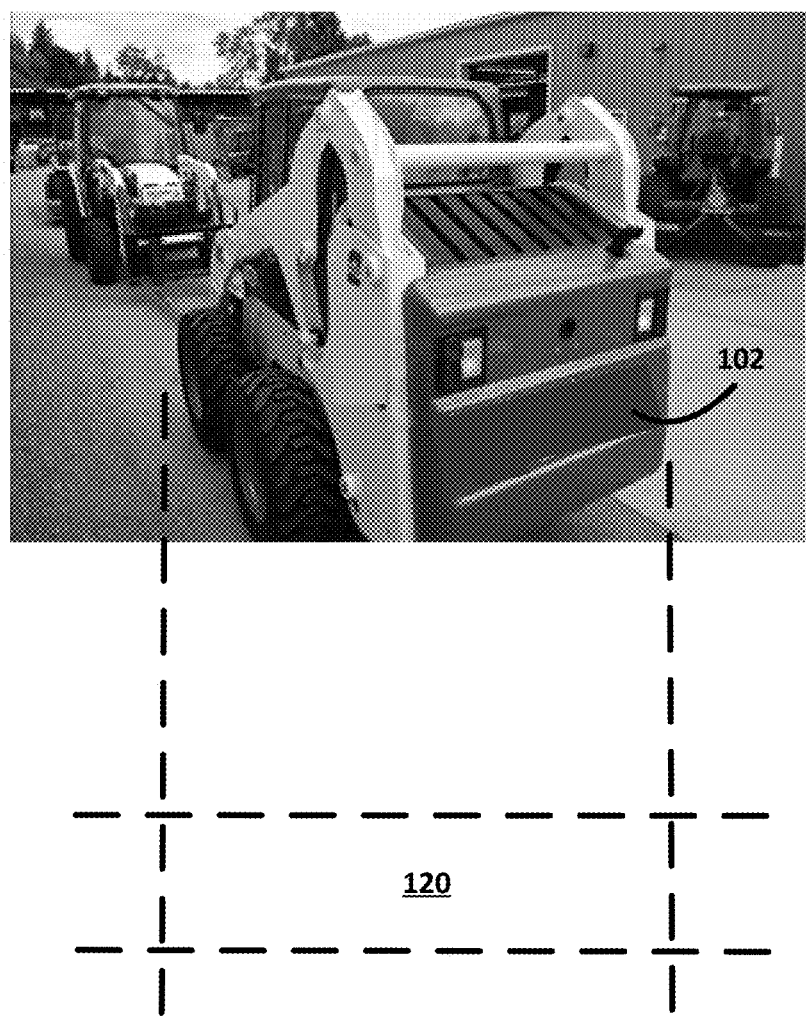
FIG. 3 is a diagram showing a field in which an image is to be captured.

Process 200 performs (204) a recognition process on the object. In some implementations, the recognition process includes identifying features, structures, locations, orientations, etc. of the object based on one or more images of the object captured using the camera. In some implementations, the recognition process requires that the camera be within a predefined location relative to the object during image capture. For example, as shown in FIG. 3, in order to perform initial object recognition, in some implementations, the camera needs to be within a predefined field of view (represented by a rectangle 120 defined by intersecting sets of parallel lines) relative to the object when the image is captured. In some implementations, recognition may be performed regardless of where the camera is positioned during image capture.

In some implementations, the recognition process (204) includes recognizing features of the object based, e.g., on regions of the object containing pixel transitions. For example, edges (example features) in the object may be recognized based on regions of the object that contain adjacent pixels having greater than a predefined difference. In an example, adjacent pixels regions may be analyzed to determine differences in the luminance and/or chrominance of those pixel regions. Adjacent regions having more than a predefined difference in luminance and/or chrominance may be characterized as edges of the object. In some implementations, the pixels may be analyzed (e.g., averaged) over a region that spans at least at least a predefined minimum number of pixels. In some examples, the change in pixel characteristics may be averaged or otherwise processed over a distance before a feature of the object is confirmed. In some implementations, dark-light transitions may be identified; sharp edges may be identified; corners may be identified; changes in contrast may be identified; and so forth. In some examples, sets of pixels of the image may be compared to known images in order to identify features. Any appropriate feature identification process may be used.

During recognition (204), process 200 identifies parts of the DT or model that have one or more attributes, such as reflectivity, transparency, or flexibility, or more than a predefined amount of one or more of these attributes. Because the initial recognition process is performed within a predefined location (e.g., field of view 120) relative to the object, the approximate locations of these parts of the object may be obtained based on the DT for the object. For example, in the case of a loader, a DT for the loader may specify the locations of windows, the reflectivity of its paint, and the locations of any other parts that are likely to adversely impact the recognition process. Because the camera is within the predefined location, the location(s) of these parts may be estimated, and information from those parts may be deem phasized when performing recognition, including identifying object edges. Furthermore, features identified from edges of the object may be correlated to expected locations of the parts of the object that have one or more attributes. For example, an edge may be detected at a location where a window is expected. This edge may represent, for example, the structure of the loader that holds the window. By detecting this edge, the location of the window may be confirmed.

As noted, in some implementations, object recognition includes identifying edges or other distinguishing features of objects based on pixel transitions. In some implementations, the recognition processes may identify those features (e.g., based on pixel transitions) in all parts of an object or image. Features identified in parts of the object that contain uncertain content may be weighted less than features identified in other parts of the object containing no, or less, uncertain content. Any appropriate weighting factor or technique may be used to weight the edges.

In some implementations, the recognition process (204) also identifies an orientation of the object in the image. The orientation of the object in the image may be determined based on the edges (or other features) of the object identified in the image. For example, the edges may be compared to edges represented by 3D graphics data in the DT. To make the comparison, one or more 3D features from the DT may be projected into two-dimensional (2D) space, and their resulting 2D projections may be compared to one or more features of the object identified in the image. Edges of the object from the image and the 3D graphical model (from the DT) that match are aligned. That is, the3D graphical model is oriented in 3D coordinate space so that its features align to identified features of the image. In a state of alignment with the object in the image, the 3D graphical model may be at specified angle(s) relative to axes in the 3D coordinate space. These angles(s) define the orientation of the 3D graphical model and, thus, also define the orientation of the object in the image relative to the camera that captured the image. Other appropriate methods of identifying the orientation of the object in the image may also be used, or may be used in conjunction with those described herein.

In some implementations, the recognition process compares identified edges or other features of the object edges or other features defined in the DT for that object. Based on a number and weighting of the matches, the recognition process is able to recognize the object in the image. Process 200 stores (205) data representing the features (e.g., edges) of the object in computer memory, and uses the data in subsequent applications, including for generating AR content.

In some implementations, the recognition process (204) can also be used to perform the identification process (202). For example, a plurality of different candidate objects, each with a different associated DT can be compared to the captured image of step 202. The recognition process (204) can be applied to the image for each DT, taking into account, for example, the one or more attributes of each DT, in attempt to recognize and therefore identify one of the candidate objects. The identification, in this case, can be a general object or a specific object instance depending on whether the DT defines a general class of objects or a specific object.

Figure 4:
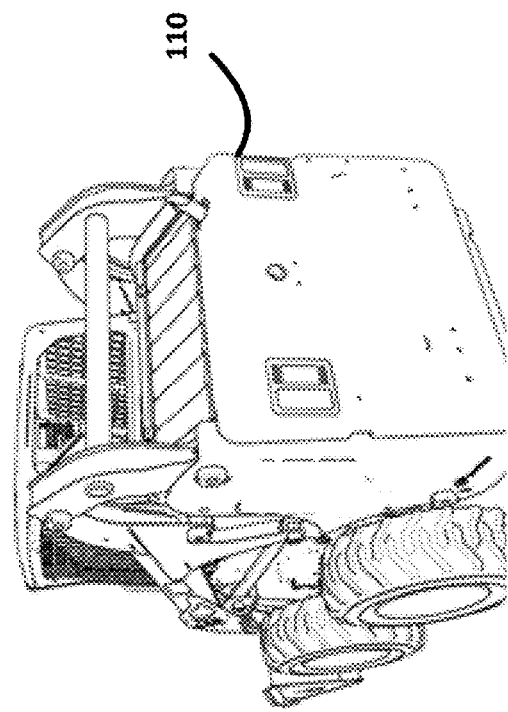
FIG. 4 is a diagram showing a representation of an object produced using three-dimensional (3D) graphic data next to an image of the object.
Figure 4:

Process 200 maps (206) the 3D graphical model defined by the DT to the object in the image. In some implementations, mapping may include associating data from the DT, such as 3D graphics data and text, with recognized parts of the object in the image. In the example of loader 102 of FIG. 1, data from the DT relating to its arm (covered by graphics 103) may be associated with the arm; data from the DT relating to front-end 108 may be associated with front-end 108; and so forth. In this example, the associating process may include storing pointers or other constructs that relate data from the DT with corresponding pixels in the image of the object. This association may further identify where, in the image, data from the DT is to be rendered when generating AR content. In the example of the loader of FIG. 1, data from the DT—such as 3D graphics or text—is mapped to the image. FIG. 4 shows, conceptually, 3D graphics 110 for the loader beside an actual image 112 of the loader. In the AR system described herein, the DT comprising the 3D graphics data may be stored in association with the image of the loader, and that association may be used in obtaining information about the loader from the image.

The mapping may include associating parts of an object having attributes that result in uncertain content with corresponding information from the DT, and using those associations to track movement of the object between image frames. In the case of a loader, for example, the DT may contain information including, but not limited to, locations of windows, locations of chrome fixtures, the reflectivity of the loader's paint, and any other appropriate information about attributes that may affect the ability of the system to recognize the loader.

During movement, a location of the camera relative to the object may change as the relative positions between the object and the camera change. For example, the camera may be controlled to capture video of the object moving; the camera may be moved and capture video while the object remains stationary; or both the camera and the object may move while the camera captures video. In this regard, in some implementations, the relative motion between the camera and the object includes the object remaining stationary while the camera moves. In some implementations, the relative motion between the camera and the object includes the object moving while the camera remains stationary. In some implementations, the relative motion between the camera and the object includes both the object and the camera moving. In any case, the relative motion is evident by the object occupying, in different (e.g., first and second) images, different locations in the image frame. Multiple images may be captured during the relative motion and, as described below, the same DT may be mapped to (e.g., associated with) the object in each image. In some implementations, the motion of the object may be tracked between image frames in real-time, and the DT may track the object's motion in real-time, thereby allowing for interaction with the object via an image from different perspectives and in real-time. In this regard, in some implementations, real-time may not mean that two actions are simultaneous, but rather may include actions that occur on a continuous basis or track each other in time, taking into account delays associated with processing, data transmission, hardware, and the like.

Figure 5:
FIG. 5 is a diagram showing the object of FIG. 1 moved relative to its original position on the display screen.

In an example, tablet computer 101 may be used to capture the image of loader 102 at a first time, $T_1$. For example, the image may be part of a video stream comprised of frames of images that are captured by walking around the loader. In another example, the image may be part of a video stream comprised of frames of images that are captured while the camera is stationary but the loader moves. Referring also to FIG. 5, in this example, the tablet computer 101 may be used to capture a different image of loader 102 at a second, different time, $T_2$. As is clear from FIGS. 1 and 5, the two images were taken from different perspectives.

To track (208) movement of the object between a first image and a second, subsequent image that follows the first image in time, a recognition process is performed (208a) to recognize the object in the first image. Recognition of the object in the first image may include identifying the position and orientation of the object in the first image. The recognition process may contain operations included in, or identical to, those performed in recognition process 204. In this regard, the first image from which movement of the object may be tracked may be the original image upon which initial recognition was based, or it may be an image that follows the original image in a sequence of images (e.g., in frames of video) and that contains the object moved from its original position. If the first image is the original image, recognition process 208a need not be performed, since recognition has already been performed for the original image in operation 204. In this regard, tracking may be performed between consecutive images in the sequence or between non-consecutive images in the sequence. For example, if the sequence contains frames A, B following immediately from A, C following immediately from B, and D following immediately from C, tracking may be performed from frame A to frame B, from frame A to frame D, and so forth.

To perform recognition process 208a, features, such as edges, in the first image, are identified based on a region in the first image that contains pixels having greater than a predefined difference. Using these features, the 3D graphical model is mapped to the object at its new location. As explained above, the DT that represents the instance of the object is retrieved from computer memory. The information includes, among other things, information identifying parts of the object that contain uncertain content. For example, the information may include parts of the object, such as locations of windows, locations of chrome fixtures, the reflectivity of the loader's paint, and any other appropriate information about attributes that may affect the ability of the system to recognize the loader.

Because process 200 knows the location of the object within the image based on the features already recognized, process 200 also knows the locations of the parts containing uncertain content. Thus, for each frame of an image that is used in tracking, the process transforms information from the DT into the image coordinate space as described herein, and then use that information to identify the regions of the image that can be deemed problematic because these regions contain uncertain content, such as specular or flexible items. With these regions identified, the process may remove these points from a pass of the tracking process, or weight them less. Accordingly, as described above, the recognition process deemphasizes information from regions of the image deemed to contain uncertain content, e.g., by weighting that information less in its recognition analysis or by ignoring that information. Regions of the first image deemed not to contain uncertain content, or less than a threshold amount of uncertain content, are weighted more heavily in the recognition analysis.

Process 200 tracks movement of the object from a first location in the first image to a second location in a second, different image. The tracking process includes recognizing that the object has moved from the first image to the second image. Recognizing motion of the object includes performing (208b), for the second image, a recognition process that places more importance on parts of the object that do not include uncertain content or that include less uncertain content than other parts of the object. To perform recognition process 208b, features, such as edges, in the second image, are identified based on a region in the second image that contains pixels having greater than a predefined difference. Using these features, the 3D graphical model is mapped to the object at its new location. As explained above, the DT that represents the instance of the object is retrieved from computer memory. The information includes, among other things, information identifying parts of the object that contain uncertain content. For example, the information may include parts of the object, such as locations of windows, locations of chrome fixtures, the reflectivity of the loader's paint, and any other appropriate information about attributes that may affect the ability of the system to recognize the loader.

Because process 200 knows the location of the object within the image based on the features already recognized, process 200 also knows the locations of these parts. Thus, for each frame of an image that is used in tracking, the process transforms information from the DT into the image coordinate space as described herein, and then uses that information to identify the regions of the image that can be deemed problematic because these regions contain uncertain content, such as specular or flexible items. With these regions identified, the process may remove these points from a pass of the tracking process, or weight them less. Accordingly, as described above, the recognition process deemphasizes information from regions of the image deemed to contain uncertain content, e.g., by weighting that information less in its recognition analysis or by ignoring that information. Regions of the second image deemed not to contain uncertain content, or less than a threshold amount of uncertain content, are weighted more heavily in the recognition analysis.

Referring to FIGS. 1 and 5, for example, the loader may move from the position shown in FIG. 1 to the position shown in FIG. 5. Movement of the object between positions may be tracked as described herein. Also, during the movement, the AR system may be configured so that the DT—e g., 3D graphics data and information defined by the DT—also tracks that relative movement. That is, the DT may be moved so that appropriate content from the DT tracks corresponding features of the moving object. In some implementations, the DT may be moved continuously with the object by adjusting the associations between data representing the object in an image frame and data representing the same parts of the object in the DT. For example, if a part of the object moves to coordinate XY in an image frame of video, the AR system may adjust the association between the DT and the image to reflect that data representing the moved part in the DT is also associated with coordinate XY. Accordingly, during tracking processes, recognition occurs as described herein based on features, such as a edges of the object, and the DT, which moves along with the object is used to identify uncertain content. This uncertain content is deem phasized or ignored in the recognition process.

In some implementations, the prior location of an object in a prior image may also be used to predict a current location of the object. This information, along with features, such as edges, that are weighted based on the amount of uncertain content they contain, may be used to determine the current location of the object, and to recognize the object. Thus, in some examples, movement of the object can predict its future location in a series of images—e.g., in frame-by-frame video—and the associations between DT data and image data may be adjusted to maintain correspondence between parts of the object in the image and their counterparts in the DT. Take arm 113 of FIG. 5 as an example. In this example, movement of the camera may result in relative motion of arm 113 in the image frame. Movement in one direction may be a factor in determining future movement of the object in that same direction, and thus in recognizing a future location of the arm. The system may also predict how to adjust the associations based on the prior movement.

Process 200 provides (209) 3D graphical content for rendering, on a graphical user interface, in association with the recognized object. For example, as the object moves from a first location to a second location, process 200 also provides appropriate 3D graphical content for rendering relative to the object at the second location, as described herein. For example, the content may overlay the image of the object or otherwise augment the image of the object.

Figure 6:
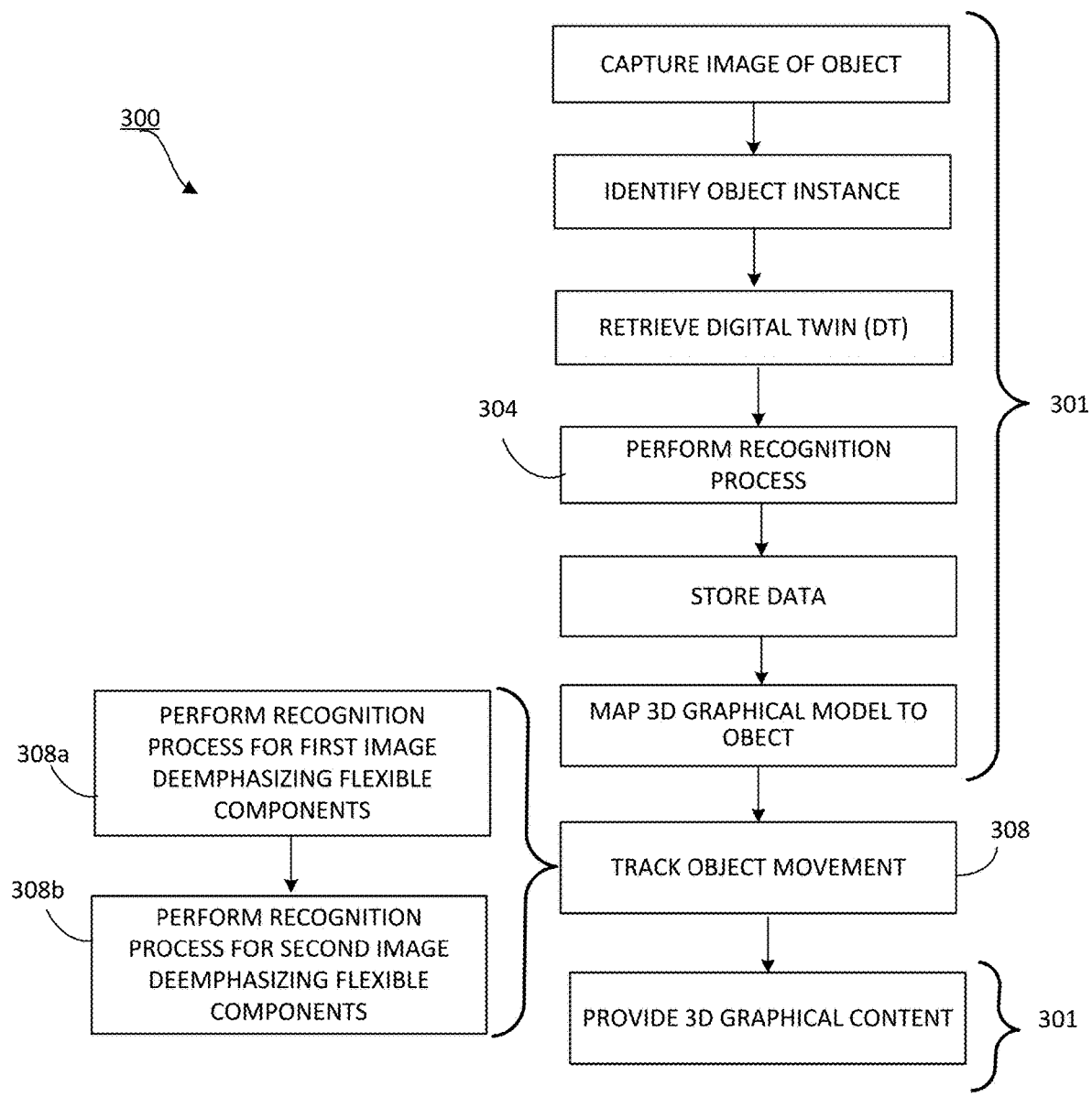
FIG. 6 is a flowchart of an example process for performing recognition and tracking processes on content in images.

FIG. 6 shows an example process 300 for treating rigid content differently than flexible content during recognition and tracking. In process 300, operations 301 incorporate all or some features of, or are identical to, operations 201 to 207 of process 200. In some implementations, the recognition process (304) may include recognizing rigid components of the object based on the object's DT. The rigid components include parts of the object that have less than a predefined degree of flexibility. The identification and recognition may be performed in the same manner as described above with respect to process 200. In some implementations, the recognition process (304) may include recognizing flexible or movable parts of the object based on the object's DT. The flexible or movable components include parts of the object that have more than a predefined degree of flexibility are or movable within a range of motion. The recognition may be performed in the same manner as described above.

The DT for the object contains information identifying the rigid components of the object, and identifying the flexible or movable of the object. In some implementations, process 300 tracks (308) movement of the object primarily by tracking movement of the rigid components individually from first locations in the first image to second locations in a second image. The tracking process includes recognizing that the rigid components have moved from the first image to the second image. Recognizing motion of the rigid components includes performing a recognition process of the type described herein to identify the rigid components based on identified edges and content included in the DT for the object. When tracking (308) the motion, more importance is placed on movement of the rigid components than on movement of the flexible components. Placing more importance may include deemphasizing impacts on motion of the flexible parts or connection mechanisms of the object and/or emphasizing impacts on motion the rigid parts of the object.

To track (308) movement of the object between a first image and a second, subsequent image that follows the first image in time, a recognition process is performed (308*a*) to recognize the object in the first image. Recognition of the object in the first image may include identifying the position and orientation of the rigid components in the first image. The recognition process may contain operations included in, or identical to, those performed in recognition process 304. In this regard, the first image from which movement of the object may be tracked may be the original image upon which initial recognition was based, or it may be an image that follows the original image in a sequence of images (e.g., in frames of video) and that contains the object moved from its original position. If the first image is the original image, recognition process 308*a* need not be performed, since recognition has already been performed for the original image in operation 304. Furthermore, tracking may be performed between consecutive images in the sequenced or between on-consecutive images in the sequence, as described.

To perform recognition process 308*a*, features, such as edges, in the rigid components are identified based on a region in the first image that contains pixels having greater than a predefined difference. Using these features, the 3D graphical model is mapped to the object at its new location. For example, constituents of the DT representing the rigid components may be mapped to locations of the rigid components. As explained above, the DT that represents the instance of the object is retrieved from computer memory. The information includes, among other things, information identifying parts of the object that contain uncertain content. For example, the information may include parts of the object, such as flexible connections (e.g., wires or hoses).

Because process 308*a* knows the location of the rigid components within the image based on the features already recognized, process 308*a* can predict the locations of any flexible or connector components based on information from the DT. Thus, for each frame of an image that is used in tracking, the process transforms information from the DT into the image coordinate space as described herein, and then uses that information to identify the regions of the image that can be deemed problematic because these regions contain uncertain content. Accordingly, as described above, the recognition process deemphasizes information from regions of the image deemed to contain uncertain content, e.g., by weighting that information less in its recognition analysis or by ignoring that information. Regions of the first image deemed not to contain uncertain content, or less than a threshold amount of uncertain content, are weighted more heavily in the recognition analysis.

Process 300 tracks movement of the object from a first location in the image to a second location in a second, different image. The tracking process includes recognizing that the object has moved from the first image to the second image. Recognizing motion of the object includes performing (308*b*), for the second image, a recognition process that places more importance on parts of the object that do not include uncertain content (e.g., rigid components) or that include less uncertain content than other parts of the object. To perform recognition process 308*b*, features, such as edges, in the second image, are identified based on a region in the second image that contains pixels having greater than a predefined difference. Using these features, the 3D graphical model is mapped to the object at its new location. As explained above, the DT that represents the instance of the object is retrieved from computer memory. The information includes, among other things, information identifying parts of the object that contain uncertain content. For example, the information may include parts of the object, such as flexible components.

Because process 308*b* knows the location of the object within the image based on the features already recognized, process 308*b* also knows the locations of these parts. Thus, for each frame of an image that is used in tracking, the process transforms information from the DT into the image coordinate space as described herein, and then use that information to identify the regions of the image that can be deemed problematic because these regions contain uncertain content, such as flexible components. With these regions identified, the processes may remove these points from a pass of the tracking process, or weight them less. Accordingly, as described above, the recognition process deemphasizes information from regions of the image deemed to contain uncertain content, e.g., by weighting that information less in its recognition analysis or by ignoring that information. Regions of the second image deemed not to contain uncertain content, or less than a threshold amount of uncertain content, are weighted more heavily in the recognition analysis.

In some implementations involving components that are movable to mask or hide other parts of an object, a region of uncertainty may be defined on the area of the object that may be at least partially obscured as a result of motion. Such area(s) may be treated as containing uncertain content, which may be deemphasized during recognition as described herein.

Figure 7:
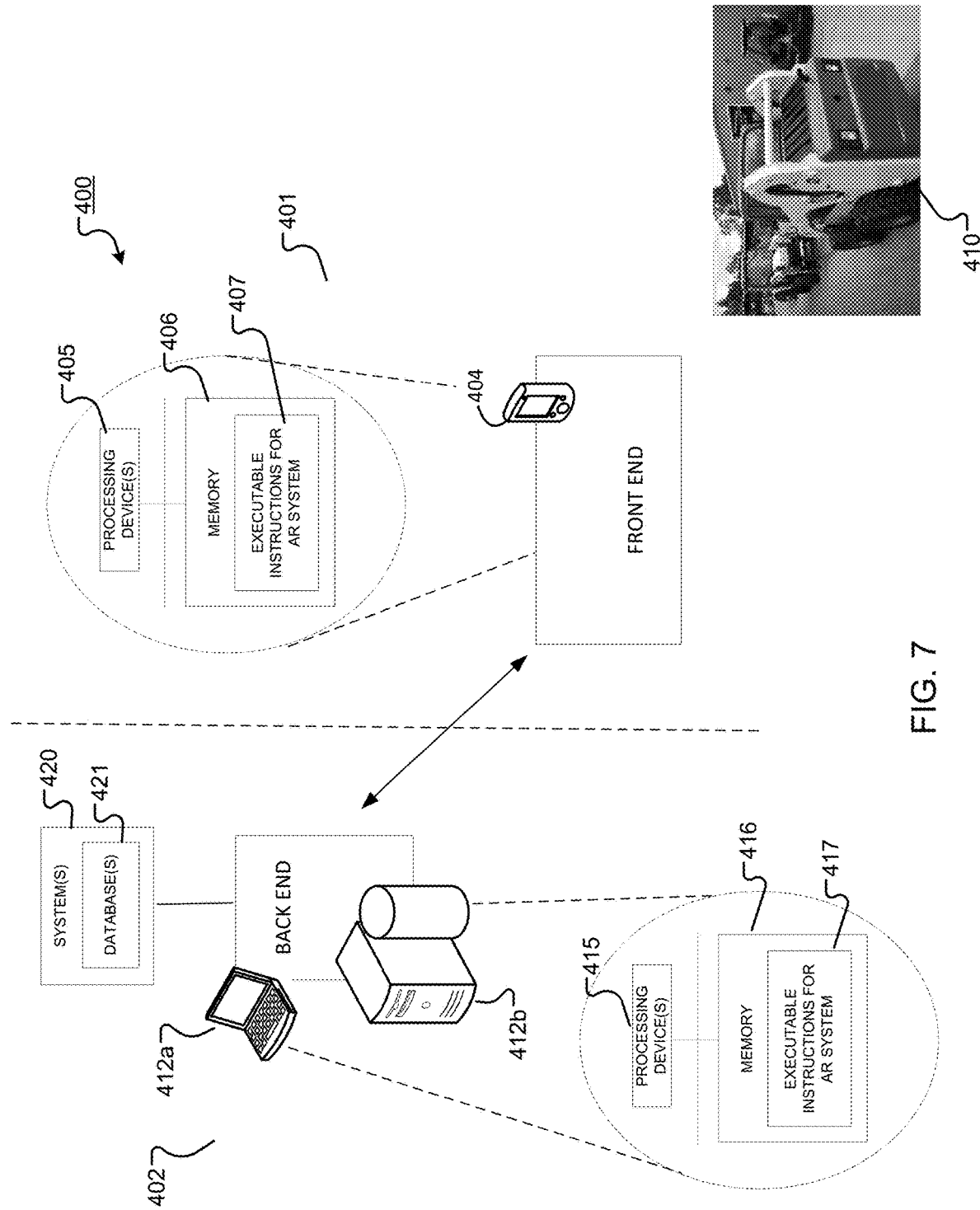
FIG. 7 is a block diagram of an example computer/network architecture on which the content recognition processes described herein may be implemented.

FIG. 7 shows an example computer/network architecture 400 on which the example AR system and the example processes described herein, may be implemented. The AR system and processes, however, are not limited to use with the FIG. 7 architecture, and may be implemented on any appropriate computer architecture and/or network architecture.

In FIG. 7, example AR system 400 includes a front-end 401 and a back-end 402. Front-end 401 may include one or more mobile computing devices (or simply, mobile devices). A mobile device may include any appropriate device capable of displaying digital imagery including, but not limited to, digital (AR) glasses, a smartphone, a digital camera, a tablet computing device, and so forth. A mobile device 404 may include one or more processing devices 405 (e.g., microprocessors) and memory 406 storing instructions 407 that are executable by the one or more processing devices. The instructions are part of one or more computer programs that are used to implement at least part of the AR system, including the object recognition processes described herein. For example, the instructions may be part of an application (or "app") that performs operations including, for example, displaying AR content to a user. Mobile device 404 also includes one or more sensing mechanisms, such as a camera for capturing actual graphics, such as images and video. Mobile device 404 may also be connected to, and accessible over, a wireless network, such as a long term evolution (LTE) network or a Wi-Fi network. The subject 410 of AR content may be any appropriate object, e.g., device, system, or entity, examples of which are described herein.

Back-end 402 may include one or more computing systems 412a, 412b examples of which include servers, desktop computers, and mobile devices. A back-end computing system may include one or more processing devices 415 (e.g., microprocessors) and memory 416 storing instructions 417 that are executable by the one or more processing devices. The instructions are part of one or more computer programs that may be used to implement at least part of the AR system. For example, the instructions may be part of a computer program to generate DTs, to analyze DT content, to communicate with other systems 420 and databases 421 containing device information, and so forth. A back-end computing system may also be connected to, and accessible over, a wired or wireless network. In some implementations, the AR system described herein may not include the back-end 402, but rather may be implemented solely on the front-end.

Front-end 401 and back-end 402 may communicate with each other, and with other systems, such as those described herein, over one or more computer networks, which may include wireless and/or wired networks.

In some implementations, a front-end device may include a local computing system (e.g., 404) to render AR content and a back-end device may include a remote computing system (e.g., 412). The capabilities of these different devices may dictate where and/or how a DT, and thus AR content, is generated. For example, the DT and AR content may be generated locally; the DT and AR content may be generated remotely and only displayed locally; or the DT and AR content may be generated using a combination of local and remote processing resources. In some implementations, the local computing system may have no onboard sensing capability and be capable only of external monitoring; in some implementations, the local computing system may include basic onboard sensing and no processing capability; in some implementations, the local computing system may include onboard sensing and basic processing capability; and in some implementations, the local computing system may include onboard sensing and processing capability equivalent at least to that of a desktop computer. In some implementations, there may be no remote computing device, but rather only mobile-to-mobile device connection; in some implementations, the remote computing system may be capable of only signal exchange, but not processing; in some implementations, the remote computing system may be capable of device and data management, basic processing, and routing to integrated peripheral systems; and in some implementations, the remote computing system may be capable of advanced servicing and data processing.

Figure 8:
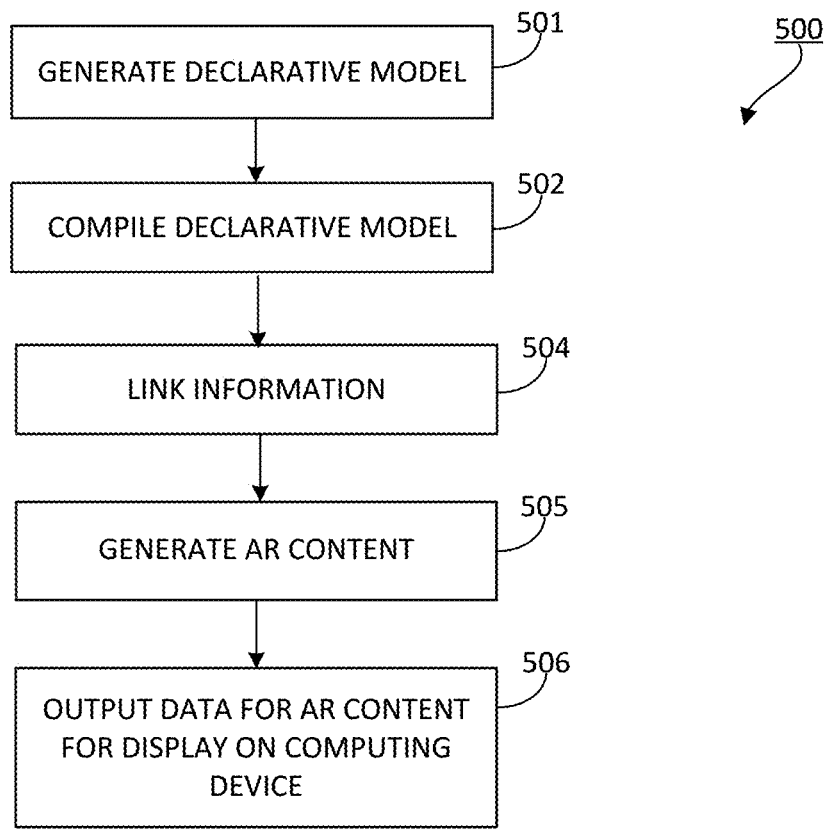
FIG. 8 is a flowchart showing an example process for generating AR content.

FIG. 8 shows an example process 500 for producing AR content from image data and 3D graphics data in the DT. Process 500 may be performed, e.g., on the architecture of FIG. 7. According to process 500, a declarative model is generated (501) for an object. The declarative model may be generated in computer code, and may include information to describe structures and functions of the object. The information may include semantic data that is stored in association with actual design data. In some examples, the declarative model of the object may be annotated to identify, among other things, features and attributes of the object. The annotations may include attributes of those features, such as size, shape, color, etc. Any appropriate techniques may be used to annotate the model. For example, metadata may be associated with specific features in the model. In some implementations, a look-up table (LUT) or other appropriate construct may be used to associate coordinates of the model with corresponding annotations.

The computer code defining the declarative model is compiled (502) to produce a compiled model. The compiled model is comprised of intermediate object code that can be read by an AR player. The declarative model, and thus the compiled model, defines the DT, or at least a part of the DT, for the object. In this example, the AR player may be executable on a front-end device of the AR system, and comprises computer code that is executable to generate AR content based on the compiled model and on an image (or other graphic) of the object.

To generate AR content for an object, the AR system links (504) information from the compiled model to corresponding information in an image (e.g., the image of the object), and generates (505) AR content based on the linked information. The AR system outputs (506) data representing the AR content for rendering on a display screen of a computing object, such as a tablet computing object. By way of example, the AR player may identify objects and their attributes that were selected as described herein. The compiled model may be read to locate the selected objects in the compiled model. Any appropriate number of attributes may be used to correlate features from the image to features in the compiled model. The AR system links the information from the compiled to the object shown in the image. For example, the compiled model may contain information describing the make, model, tread, and so forth of a tire. The compiled model may also contain sensor readings, or other information. That information is linked to the tire in the image. That information may be used to generate AR content, as described herein.

The AR player may generate AR content by rendering computer graphics generated from data in the DT over appropriate locations of the image. For example, the AR player may identify an element of a graphic in the manner described above, obtain information about that graphic from annotations and/or other information available in the compiled model, and generate the graphic based on information from the compiled model and/or sensor readings.

In some implementations, the computer graphics that form part of the AR content may overlay the same element shown in an image to enhance or explain an aspect of the element. In some implementations, the computer graphics do not overlay the element, but rather are adjacent to, or reference, the element. As noted, the AR content may be generated for an image or video, e.g., on a frame-by-frame basis. Thus, the AR content may be static (unchanging) or dynamic (changeable over time). In the case of video, features in frames of video may be identified using appropriate object identification and object tracking techniques. The computer graphics portion of the AR content may track movement frame-by-frame of the actual object during playback of the video. The video may be real-time video, although that is not a requirement. In the case of real-time video, the DT may be generated or updated in real-time, and the resulting computer graphics superimposed on frames in real-time. Updating the DT may include changing the declarative model and the compiled model, and/or other data used to define the DT, as appropriate.

Computing systems that may be used to implement all or part of the front-end and/or back-end of the AR system may include various forms of digital computers. Examples of digital computers include, but are not limited to, laptops, desktops, workstations, personal digital assistants, servers, blade servers, mainframes, smart televisions and other appropriate computers. Mobile devices may be used to implement all or part of the front-end and/or back-end of the AR system. Mobile devices include, but are not limited to, tablet computing devices, personal digital assistants, cellular telephones, smartphones, digital cameras, digital glasses and other portable computing devices. The computing devices described herein, their connections and relationships, and their functions, are meant to be examples only, and are not meant to limit implementations of the technology.

All or part of the processes described herein and their various modifications (hereinafter referred to as "the processes") can be implemented, at least in part, via a computer program product, e.g., a computer program tangibly embodied in one or more information carriers, e.g., in one or more tangible machine-readable storage media, for execution by, or to control the operation of, data processing apparatus, e.g., a programmable processor, a computer, or multiple computers A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Non-transitory machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Each computing device, such as a tablet computer, may include a hard drive for storing data and computer programs, and a processing device (e.g., a microprocessor) and memory (e.g., RAM) for executing computer programs. Each computing device may include an image capture device, such as a still camera or video camera. The image capture device may be built-in or simply accessible to the computing device.

Each computing device may include a graphics system, including a display screen. A display screen, such as an LCD or a CRT (Cathode Ray Tube) displays, to a user, images that are generated by the graphics system of the computing device. As is well known, display on a computer display (e.g., a monitor) physically transforms the computer display. For example, if the computer display is LCD-based, the orientation of liquid crystals can be changed by the application of biasing voltages in a physical transformation that is visually apparent to the user. As another example, if the computer display is a CRT, the state of a fluorescent screen can be changed by the impact of electrons in a physical transformation that is also visually apparent. Each display screen may be touch-sensitive, allowing a user to enter information onto the display screen via a virtual keyboard. On some computing devices, such as a desktop or smartphone, a physical QWERTY keyboard and scroll wheel may be provided for entering information onto the display screen. Each computing device, and computer programs executed thereon, may also be configured to accept voice commands, and to perform functions in response to such commands. For example, the example processes described herein may be initiated at a client, to the extent possible, via voice commands.

Elements of different implementations described herein may be combined to form other implementations not specifically set forth above. Elements may be left out of the processes, computer programs, user interfaces, etc. described herein without adversely affecting their operation or the operation of the system in general. Furthermore, various separate elements may be combined into one or more individual elements to perform the functions described herein.

Other implementations not specifically described herein are also within the scope of the following claims.

What is claimed is:

1. A method performed by one or more processing devices, comprising:
    obtaining, from computer memory, information from a three-dimensional (3D) graphical model that represents an object;
    identifying, based on the information, a first part of the object having an attribute;

performing a recognition process to identify the object based on features of the object, where to identify the object the recognition process attaches more importance to a second part of the object than to the first part, the second part either not having the attribute or having less of the attribute than the first part; and providing data for rendering content on a graphical user interface based, at least in part, on recognition of the object performed by the recognition process.

2. The method of claim 1, wherein attaching more importance to the second part of the object comprises ignoring information about the first part of the object during the recognition process.

3. The method of claim 1, wherein attaching more importance to the second part of the object comprises deemphasizing information about the first part of the object during the recognition process.

4. The method of claim 1, further comprising tracking movement of the object from a first location to a second location;
wherein tracking the movement comprises:
identifying, in a first image, a feature in the second part of the object, the feature being identified based on a region in the first image that contains pixels having greater than a predefined difference; and
identifying, in a second image, the feature in the second part of the object, the feature being identified based on a region in the second image that contains pixels having greater than the predefined difference; and
wherein the second location is based on a location of the feature in the second image.

5. The method of claim 4, wherein the feature is a first feature;
wherein the tracking further comprises:
identifying, in the first image, a second feature in the first part of the object, the second feature being identified based on a second region in the first image that contains pixels having greater than a predefined difference; and
identifying, in the second image, the second feature in the first part of the object, the second feature being identified based on a second region in the second image that contains pixels having greater than the predefined difference;
wherein the second location is based on both a location of the first feature in the second image and a location of the second feature in the second image; and
wherein deemphasizing comprises weighting the location of the second feature in the second image less heavily than the location of the first feature in the second image.

6. The method of claim 4, further comprising capturing the first image within a field specified for recognition of the object.

7. The method of claim 1, wherein the attribute comprises an amount of reflectivity.

8. The method of claim 1, wherein the attribute comprises an amount of transparency.

9. The method of claim 1, wherein the attribute comprises an amount of flexibility.

10. The method of claim 1, wherein the attribute comprises an amount of the object that is coverable based on motion of one or more other parts of the object.

11. A method performed by one or more processing devices, comprising:

obtaining, from computer memory, information from a three-dimensional (3D) graphical model that represents an object;

identifying, based on the information, rigid components of the object that are connected by a flexible component of the object;

performing a recognition process to identify the object based on features of the rigid components, where to identify the object the recognition process attaches more importance to the rigid components than to the flexible component; and providing data for rendering content on a graphical user interface based, at least in part, on recognition of the object performed by the recognition process.

12. The method of claim 11, further comprising tracking movement of the object from a first location in a first image to a second location in a second image.

13. The method of claim 12, wherein tracking the movement of the object from the first location in the first image to the second location in the second image comprises ignoring the flexible component and not taking into account an impact of the flexible component when tracking the movement.

14. The method of claim 12, wherein tracking movement of the object from the first location in the first image to the second location in the second image comprises deemphasizing an impact of the flexible component when tracking the movement, but not ignoring the impact.

15. The method of claim 12, wherein tracking movement of the object from the first location in the first image to the second location in the second image comprises:
tracking movement of the rigid components individually; and
predicting a location of the flexible component based on locations of the rigid components following movement.

16. One or more non-transitory machine-readable storage media storing instructions that are executable by one or more processing devices to perform operations comprising:

obtaining, from computer memory, information from a three-dimensional (3D) graphical model that represents an object;

identifying, based on the information, a first part of the object having an attribute;

performing a recognition process to identify the object based on features of the object, where to identify the object the recognition process attaches more importance to a second part of the object than to the first part, the second part either not having the attribute or having less of the attribute than the first part; and providing data for rendering content on a graphical user interface based, at least in part, on recognition of the object performed by the recognition process.

17. The one or more non-transitory machine-readable storage media of claim 16, wherein the operations comprise tracking movement of the object from a first location to a second location; and
wherein tracking the movement comprises:
identifying, in a first image, a feature in the second part of the object, the feature being identified based on a region in the first image that contains pixels having greater than a predefined difference; and
identifying, in a second image, the feature in the second part of the object, the feature being identified based on a region in the second image that contains pixels having greater than the predefined difference; and
wherein the second location is based on a location of the feature in the second image.

18. One or more non-transitory machine-readable storage media storing instructions that are executable by one or more processing devices to perform operations comprising:
   obtaining, from computer memory, information from a three-dimensional (3D) graphical model that represents an object;
   identifying, based on the information, rigid components of the object that are connected by a flexible component of the object;
   performing a recognition process to identify the object based on features of the rigid components, where to identify the object the recognition process attaches more importance to the rigid components than to the flexible component; and
   providing data for rendering content on a graphical user interface based, at least in part, on recognition of the object performed by the recognition process.

19. A system comprising:
   one or more non-transitory machine-readable storage media storing instructions that are executable; and
   one or more processing devices to execute the instructions to perform operations comprising:
      obtaining, from computer memory, information from a three-dimensional (3D) graphical model that represents an object;
      identifying, based on the information, a first part of the object having an attribute;
      performing a recognition process to identify the object based on features of the object, where to identify the object the recognition process attaches more importance to a second part of the object than to the first part, the second part either not having the attribute or having less of the attribute than the first part; and
      providing data for rendering content on a graphical user interface based, at least in part, on recognition of the object performed by the recognition process.

20. The system of claim 19, wherein the operations comprise tracking movement of the object from a first location to a second location; and
   wherein tracking the movement comprises:
      identifying, in a first image, a feature in the second part of the object, the feature being identified based on a region in the first image that contains pixels having greater than a predefined difference; and
      identifying, in a second image, the feature in the second part of the object, the feature being identified based on a region in the second image that contains pixels having greater than the predefined difference; and
   wherein the second location is based on a location of the feature in the second image.

21. A system comprising:
   one or more non-transitory machine-readable storage media storing instructions that are executable; and
   one or more processing devices to execute the instructions to perform operations comprising:
      obtaining, from computer memory, information from a three-dimensional (3D) graphical model that represents an object;
      identifying, based on the information, rigid components of the object that are connected by a flexible component of the object;
      performing a recognition process to identify the object based on features of the rigid components, where to identify the object the recognition process attaches more importance to the rigid components than to the flexible component; and
      providing data for rendering content on a graphical user interface based, at least in part, on recognition of the object performed by the recognition process.

* * * * *